US010237429B2

United States Patent
Kodimer

(10) Patent No.: US 10,237,429 B2
(45) Date of Patent: Mar. 19, 2019

(54) SYSTEM AND METHOD FOR DEVICE GAMIFICATION DURING JOB PROCESSING

(71) Applicants: Kabushiki Kaisha Toshiba, Minato-ku (JP); Toshiba TEC Kabushiki Kaisha, Shinagawa-ku (JP)

(72) Inventor: Marianne Kodimer, Huntington Beach, CA (US)

(73) Assignees: Kabushiki Kaisha Toshiba, Minato-ku (JP); Toshiba TEC Kabushiki Kaisha, Shinagawa-ku (JP)

(*) Notice: Subject to any disclaimer, the term of this patent is extended or adjusted under 35 U.S.C. 154(b) by 0 days.

(21) Appl. No.: 15/692,139

(22) Filed: Aug. 31, 2017

(65) Prior Publication Data

US 2018/0115663 A1 Apr. 26, 2018

Related U.S. Application Data

(60) Provisional application No. 62/410,524, filed on Oct. 20, 2016.

(51) Int. Cl.
*G03G 15/00* (2006.01)
*H04N 1/00* (2006.01)
*H04N 1/34* (2006.01)

(52) U.S. Cl.
CPC ....... *H04N 1/00437* (2013.01); *G03G 15/502* (2013.01); *H04N 1/0044* (2013.01); *H04N 1/00411* (2013.01); *H04N 1/00427* (2013.01); *H04N 1/00477* (2013.01); *H04N 1/00501* (2013.01); *H04N 1/00506* (2013.01); *H04N 1/346* (2013.01)

(58) Field of Classification Search
CPC ............. G03G 15/5016; G03G 15/502; H04N 1/00437; H04N 1/00411; H04N 1/00427; H04N 1/00477; H04N 1/0049; H04N 1/00501; H04N 1/00506
USPC .......................................................... 399/81
See application file for complete search history.

(56) References Cited

U.S. PATENT DOCUMENTS

| 5,583,617 | A | * | 12/1996 | Altrieth, III | ....... G03G 15/5016 345/618 |
| 7,068,385 | B2 | * | 6/2006 | Kohli | ..................... G06K 15/00 358/1.13 |
| 2004/0057743 | A1 | * | 3/2004 | McIntyre | ........... G03G 15/5016 399/81 |

(Continued)

FOREIGN PATENT DOCUMENTS

| JP | 2002192800 | A | * | 7/2002 |
| JP | 2006163675 | A | * | 6/2006 |

(Continued)

*Primary Examiner* — Robert B Beatty
(74) *Attorney, Agent, or Firm* — Ulmer & Berne LLP

(57) ABSTRACT

A system and method for gamification of multifunction peripherals includes an intelligent controller having a processor and memory. A touchscreen user interface configured to receive a document processing instruction from an associated user. Electronic images of user fortunes are stored in memory. The processor monitors background tasks on the controller after receipt of a document processing instruction from the user and generates a user interactive graphical image of a tangible object on the touch screen. When a user touches the image on the touch screen, it then displays a user fortune image of a fortune.

18 Claims, 6 Drawing Sheets

(56) References Cited

U.S. PATENT DOCUMENTS

| | | | |
|---|---|---|---|
| 2008/0170044 A1* | 7/2008 | Kanada | G03G 15/5016 345/173 |
| 2010/0149573 A1* | 6/2010 | Pat | H04N 1/00477 358/1.13 |
| 2013/0250315 A1* | 9/2013 | DeRoller | G03G 15/55 358/1.9 |
| 2017/0346970 A1* | 11/2017 | Kodimer | H04N 1/00503 |
| 2018/0113859 A1* | 4/2018 | Kodimer | G06F 17/289 |
| 2018/0115667 A1* | 4/2018 | Kodimer | H04N 1/00514 |

FOREIGN PATENT DOCUMENTS

| | | | | | |
|---|---|---|---|---|---|
| JP | 2006217638 A | * | 8/2006 | | G06T 11/00 |
| JP | 2007013858 A | * | 1/2007 | | |

\* cited by examiner

SYSTEM AND METHOD FOR DEVICE GAMIFICATION DURING JOB PROCESSING

RELATED APPLICATIONS

This application claims the benefit of U.S. Provisional Application No. 62/410,524, filed Oct. 20, 2016, which is incorporated herein by reference.

TECHNICAL FIELD

This application relates generally to multifunction peripherals with a gamification interface. This application relates more particularly to a multifunction peripheral with enhanced usability to generate user fortunes with multifunction peripheral device touchscreen interaction while a user would otherwise idly wait for completion of a background processing task.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

MFPs are essential business tools it a modern office environment. Earlier devices employed discrete mechanical switches or buttons for user device control. As MFPs became more powerful and configurable, device control was accomplished by an on-board computer referred to as an intelligent controller. A controller can be programmed to control MFP functions such as scanning, printing, or copying. A copying operation could be accomplished by controlling the scanner and printer sequentially. Controllers could also function to enable additional device functions such as stapling or hole punching. Increased device functionality lead to a menu driven, touchscreen user interface to enable a user to easily configure an MFP to accomplish a desired document processing job. MFP menus are designed to be intuitive and logical to allow users to perform their selected document processing tasks efficiently.

SUMMARY

In accordance with an example embodiment of the subject application, a system and method for gamification of multifunction peripherals includes an intelligent controller having a processor and memory. Electronic images of user fortunes are stored in memory. A touchscreen user interface is configured to receive a document processing instruction from an associated user. The processor monitors background tasks on the controller after receipt of a document processing instruction from the user and generates a user interactive graphical image of a tangible object on the touch screen. When a user touches the image on the touch screen, it then displays a user fortune image of a fortune.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

MFPs are powerful and essential business tools. However, user interaction is straightforward and accomplished with touchscreen menus that are solely geared toward accomplishing a typical document processing operation, such as scanning, printing or copying. While functional, touchscreen device interfaces are extremely unengaging for users, particularly when a user uses a device regularly for the same or similar tasks. Also, many document processing tasks require a user to stand by idly while they are being run. By way of particular example, a user may place a stack of documents for scanning in a sheet feeder and select a copy or scan operation from the MFP. It may take a few seconds or several minutes for all paper documents to be processed. In another example, a user may approach an MFP and select an electronic file for printing. Once a print command is issued by the user, they may stand around until all pages are printed. Such periods when users must idly wait for a job or a device background task to be completed can be frustrating and boring.

The subject application teaches example embodiments of MFPs that accomplish device operation in a gamification context. Gamification includes an application of typical elements of game playing (e.g., point scoring, competition with others, rules of play) to other areas of activity to encourage engagement with a product or service. Enhanced user/device interaction is realized with application of game-design elements and game principles in non-game contexts.

Figure 1:
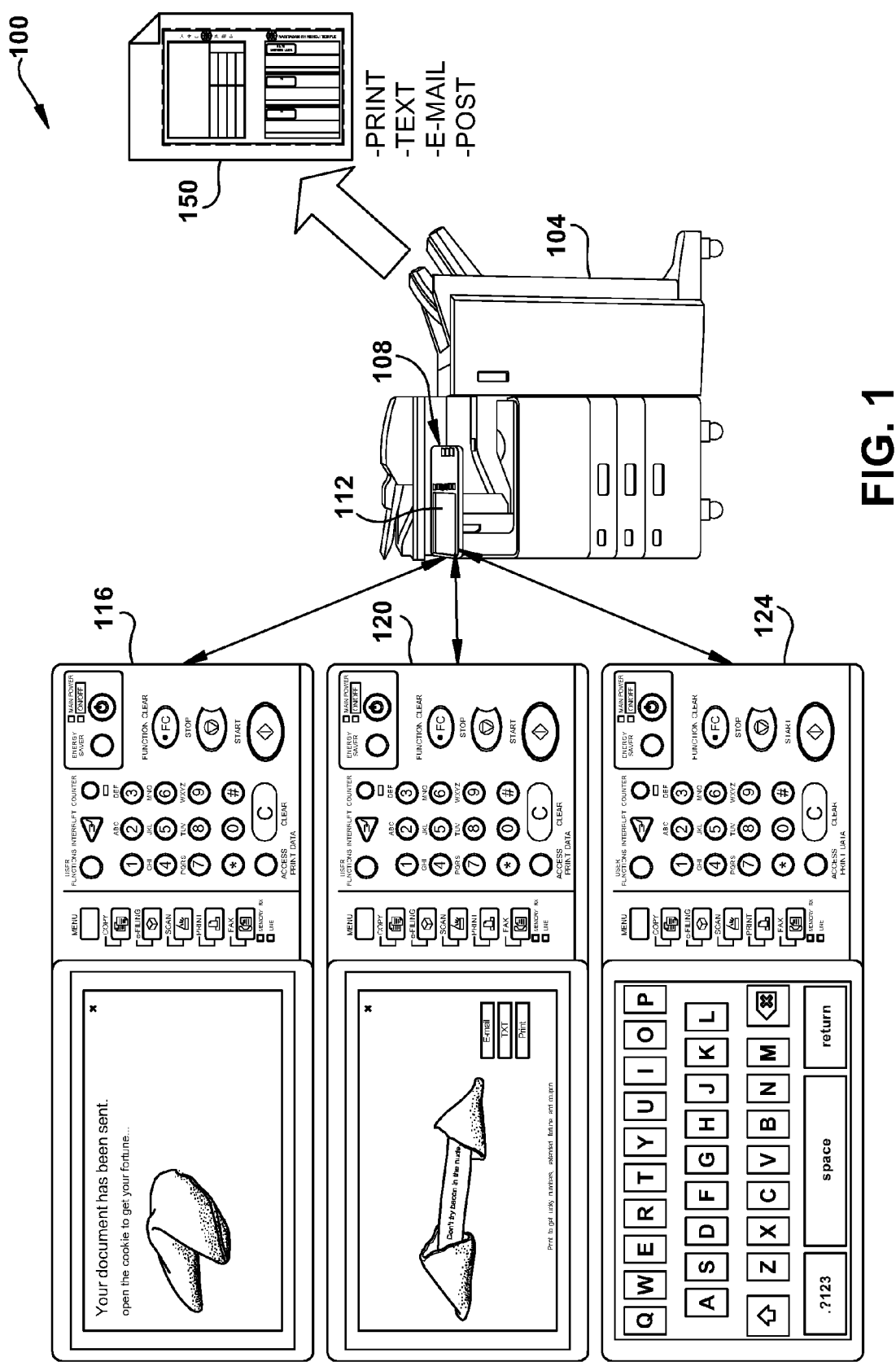
FIG. 1 an example embodiment of a multifunction peripheral gamification system.

In one example embodiment, an MFP is provided with a gamification interface that enables an MFP to mimic receiving and opening a virtual fortune cookie during wait periods. In accordance with the subject application, FIG. 1 illustrates an example embodiment of a gamification system 100 running on MFP 104. MFP 104 includes a user interface 108 including a touch screen 112 configured to generate graphical or text images, and suitably programmable to generate a soft keyboard for numeric or text entry. In the illustrated example embodiment, gamification of MFP 104 is accomplished by generation of a series of user interface renderings 116, 120, and 124.

Figure 2:
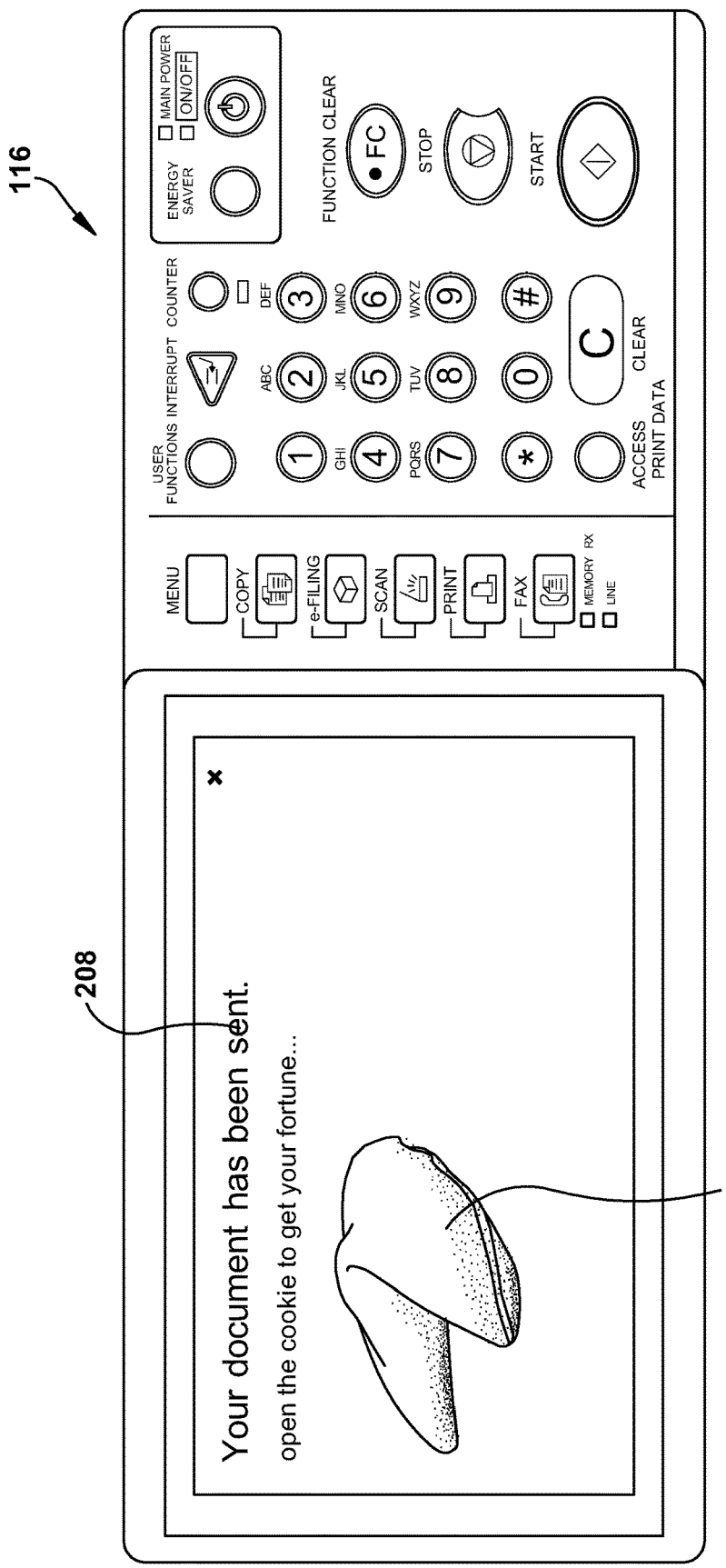
FIG. 2 is an example embodiment of a user interface depicting a graphical rendering of an interactive fortune cookie image on an MFP display.

Interface rendering 116, with added reference to FIG. 2, includes a graphical rendering of a fortune cookie 204 which is generated when a user submits an instruction to MFP 104 which will require them to wait for a period while it is being processed. In this example, the user has sent a document as depicted by message 208 causing background processes to occur while the user waits. The user is prompted to tap the touchscreen fortune cookie 204, suitably by tapping the image or pinching the image on the touch screen to open the fortune cookie.

Figure 3:
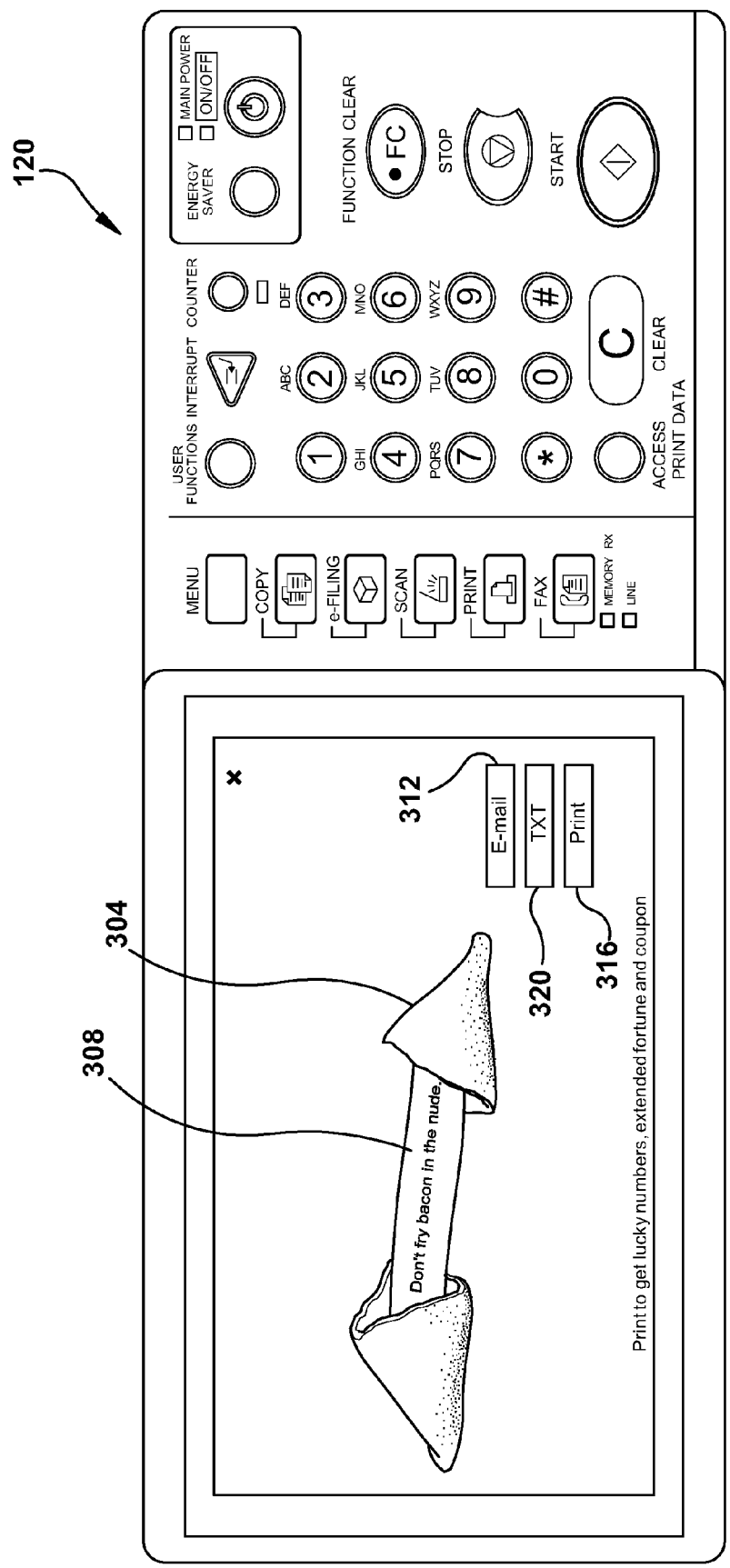
FIG. 3 is an example embodiment of a user interface screen depicting a graphical image of printed fortune emerging from a fortune cookie.
Figure 4:
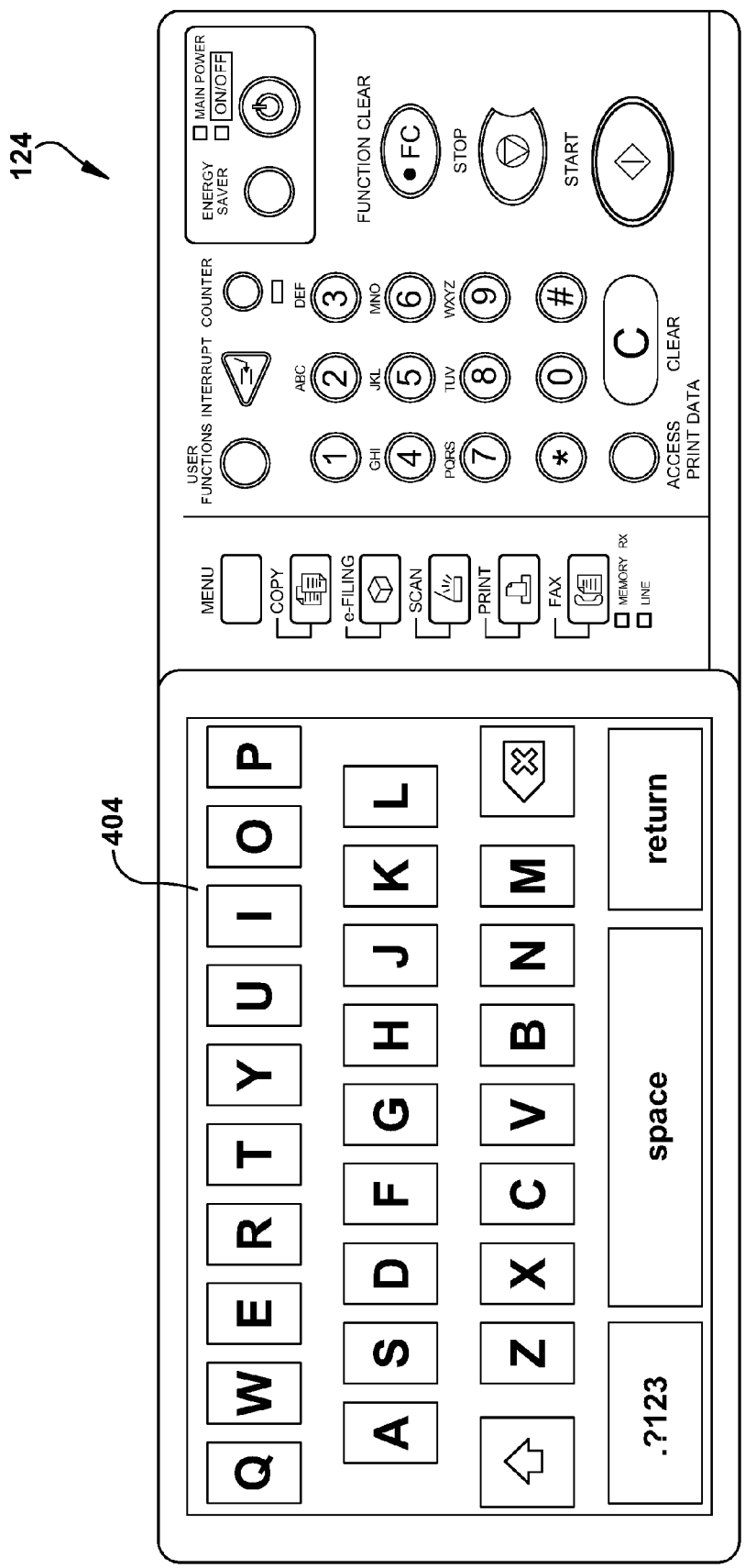
FIG. 4 is an example embodiment of a user interface screen depicting a graphical image showing a virtual keyboard.

Next, with added reference to FIG. 3, interface rendering 120 depicts an opened fortune cookie 304 along with a printed fortune 308 that appears to be on a paper previously enclosed in the unopened fortune cookie 204 of FIG. 2. Displayed fortunes 308 are suitably selected at random from a set of fortunes stored in the MFP device or retrieved from remote storage. The user suitably receives a prompt to print 316 or share their fortune document, such as by selecting e-mail button 312, text message button 320, or any other sharing mechanism such as an INTAGRAM post, a TWITTER tweet, a FACEBOOK post, a SNAPCHAT post, or the like. Referring additionally to FIG. 4, in interface rendering 124 address information is suitably provided in conjunction with a virtual keyboard 404, or any other suitable addressing means, such as by address book lookup or the like.

Figure 5:
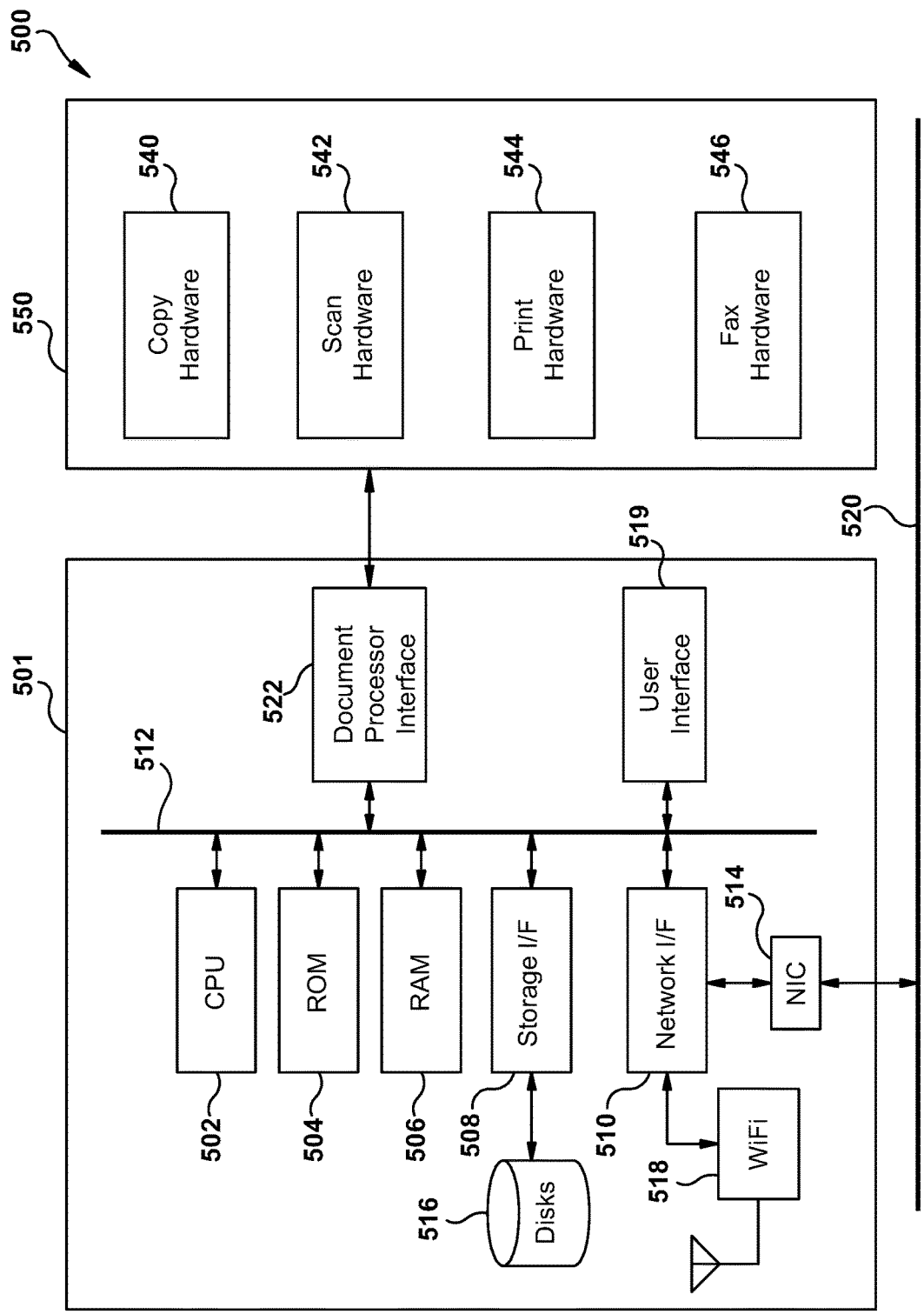
FIG. 5 is a functional block diagram of an example embodiment of a multifunction peripheral.

Turning now to FIG. 5 illustrated is an example embodiment of a networked digital device comprised of document rendering system 500 suitably comprised within an MFP, such as with MFP 104 of FIG. 1. Included in controller 501 are one or more processors, such as that illustrated by processor 502. Each processor is suitably associated with non-volatile memory, such as ROM 504, and random access memory (RAM) 506, via a data bus 512.

Processor 502 is also in data communication with a storage interface 508 for reading or writing to a storage 516, suitably comprised of a hard disk, optical disk, solid-state disk, cloud-based storage, or any other suitable data storage as will be appreciated by one of ordinary skill in the art.

Processor 502 is also in data communication with a network interface 510 which provides an interface to a network interface controller (NIC) 514, which in turn provides a data path to any suitable wired or physical network connection 520, or to a wireless data connection via wireless network interface 518. Example wireless connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like. Processor 502 is also in data communication with one or more sensors which provide data relative to a state of the device or associated surroundings, such as device temperature, ambient temperature, humidity, device movement and the like.

Processor 502 can also be in data communication with any suitable user input/output (I/O) interface 519 which provides data communication with user peripherals, such as displays, keyboards, mice, track balls, touch screens, or the like.

Also in data communication with data bus 512 is a document processor interface 522 suitable for data communication with MFP functional units 550. In the illustrate example, these units include copy hardware 540, scan hardware 542, print hardware 544 and fax hardware 546 which together comprise MFP functional hardware 750. Hardware monitors suitably provide device event data, working in concert with suitable monitoring systems. By way of further example, monitoring systems may include page counters, sensor output, such as consumable level sensors, temperature sensors, power quality sensors, device error sensors, door open sensors, and the like. It will be understood that functional units are suitably comprised of intelligent units, including any suitable hardware or software platform.

Figure 6:
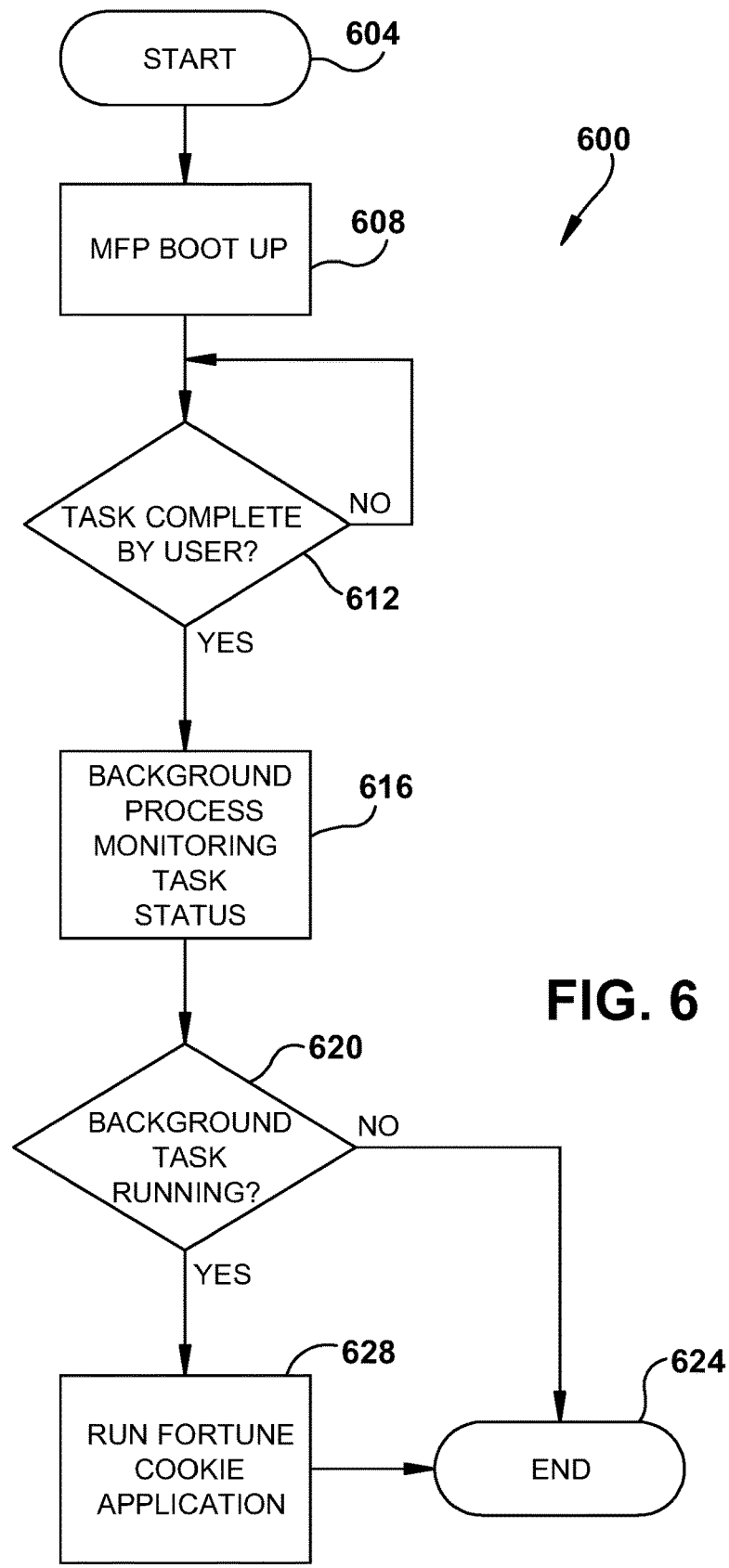
FIG. 6 is a flowchart an example embodiment of operations for accomplishing gamification on a multifunction peripheral.

Referring next to FIG. 6, illustrated is a flowchart 600 of an example embodiment of operations for accomplishing the forgoing on an MFP by use of its associated controller. The process commences at block 604 with an application launch, followed by an MFP boot at block 608 which allows users to commence using the device. When a user completes entry of commands to initiate a task, block 612 determines when the user's entry is complete and proceeds to block 616 when it is. The system monitors for background tasks or other device-related tasks at block 616. If no such task is present at block 620, the process ends at block 624. If a task is running at block 620, a gamification application, such as the above example of a fortune cookie application, is run at block 628 before the process ends at block 624.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A document processing system comprising:
a document processing engine configured to render printed output from electronic image files;
an intelligent controller including a processor and memory, the controller configured for controlled operation of the document processing engine; and
a touchscreen user interface configured to receive a document processing instruction from an associated user,
wherein the memory is configured to store a plurality of electronic images directed to user entertainment,
wherein the processor is configured to monitor background tasks on the controller after receipt of a document processing instruction,
wherein the processor is further configured to generate a graphical image of an unopened fortune cookie on the touch screen,
wherein the processor is further configured to receive a user touch data corresponding to a touch of the graphical image by a user, and
wherein the processor is further configured to display, on the touch screen, an electronic image comprising the user's fortune in accordance with received user touch data.

2. The document processing system of claim 1 wherein the processor is further configured to retrieve an arbitrary electronic image.

3. The document processing system of claim 1 wherein the processor is further configured to enable the document processing engine to print a rendering of the user fortune.

4. The document processing system of claim 1 wherein the processor is further configured to send an output file of the user fortune to an associated data device.

5. The document processing system of claim 4 wherein the processor is further configured to send the output file to a destination address received via the touchscreen interface.

6. The document processing system of claim 5 wherein the destination address is selected from the group consisting of an e-mail address, phone number, and a social network account.

7. A method comprising:
receiving a document processing instruction from an associated user into an intelligent controller of a multifunction peripheral via a touchscreen user interface;
storing a plurality of electronic images of user fortunes in controller memory;
monitoring background tasks on the controller after receipt of a document processing instruction;
generating a user interactive graphical image of a tangible object on the touch screen when a background task related to the document processing instruction is running on the controller;
receiving user touch data corresponding to a touch of the interactive graphical image by a user; and
displaying, on the touch screen, a user fortune image corresponding to an electronic image in accordance with received user touch data.

8. The method of claim 7 further comprising printing a rendering of the user fortune.

9. The method of claim 7 further comprising sending an output file of the user fortune to an associated data device.

10. The method of claim 9 further comprising sending the output file to a destination address received via the touchscreen interface.

11. The method of claim 10 further comprising sending the output file to the destination address comprised of an e-mail address.

12. The method 10 further comprising sending the output file to the destination address comprised of a phone number.

13. The method of claim 10 further comprising sending the output file to the destination address comprised of social network account.

14. A device comprising:
a processor and associated memory; and
a user interface including a user input and a display,
wherein the processor is configured to receive a job command from an associated user via the user interface,
wherein the processor is further configured to initiate a job corresponding to a received job command,
wherein the processor is further configured for monitoring progress of an initiated job,
wherein the processor is further configured to generate an user entertainment graphic comprise of a fortune cookie on the display when the initiated job is in progress,
wherein the processor is further configured to receive user selection data responsive to the user entertainment graphic generated on the display,
wherein the processor is further configured to generate a secondary user entertainment graphic on the display responsive to received user selection data, and
wherein the processor is configured to display a job notice on the display when the initiated job is no longer in progress.

15. The device of claim 14 wherein the job command initiates at least one background process on the processor which background process is required for completion of the job.

16. The device of claim 15 wherein the job command initiates a document processing operation on an associated document processing engine.

17. The device of claim 16 wherein the document processing engine is comprised of a print engine.

18. The device of claim 17 wherein the secondary user entertainment graphic is comprised of user fortune retrieved at random from a plurality of electronic documents disposed in the memory.

* * * * *